United States Patent
Motoyama et al.

(10) Patent No.: US 10,390,544 B2
(45) Date of Patent: Aug. 27, 2019

(54) MUNG BEAN PROTEIN GEL COMPOSITION AND CHEESE-LIKE FOOD

(71) Applicant: FUJI OIL COMPANY LIMITED, Izumisano-shi, Osaka (JP)

(72) Inventors: Takayasu Motoyama, Tsukubamirai (JP); Shigeru Ashida, Tsukubamirai (JP)

(73) Assignee: FUJI OIL COMPANY LIMITED, Osaka (JP)

( * ) Notice: Subject to any disclaimer, the term of this patent is extended or adjusted under 35 U.S.C. 154(b) by 883 days.

(21) Appl. No.: 14/778,358

(22) PCT Filed: Mar. 7, 2014

(86) PCT No.: PCT/JP2014/055920
§ 371 (c)(1),
(2) Date: Sep. 18, 2015

(87) PCT Pub. No.: WO2014/156549
PCT Pub. Date: Oct. 2, 2014

(65) Prior Publication Data
US 2016/0050951 A1 Feb. 25, 2016

(30) Foreign Application Priority Data
Mar. 28, 2013 (JP) .................. 2013-069706

(51) Int. Cl.
| A23L 11/00 | (2016.01) |
| A23C 20/02 | (2006.01) |
| A23C 20/00 | (2006.01) |
| A23J 3/14 | (2006.01) |
| A23L 33/16 | (2016.01) |
| A23L 33/185 | (2016.01) |

(52) U.S. Cl.
CPC .......... *A23C 20/025* (2013.01); *A23C 20/005* (2013.01); *A23J 3/14* (2013.01); *A23L 11/00* (2016.08); *A23L 33/16* (2016.08); *A23L 33/185* (2016.08); *A23V 2002/00* (2013.01)

(58) Field of Classification Search
CPC ..... A23C 20/025; A23C 20/005; A23L 33/16; A23L 11/00
USPC ...................................................... 426/573
See application file for complete search history.

(56) References Cited

U.S. PATENT DOCUMENTS

| 4,111,927 A * | 9/1978 | Satterlee | ................. | A21D 2/266 |
| | | | | 426/431 |
| 4,284,656 A * | 8/1981 | Hwa | ......................... | A23J 1/14 |
| | | | | 426/641 |

| 2008/0213428 A1 | 9/2008 | Sato et al. |
| 2009/0136634 A1 * | 5/2009 | Taketsuka ............ A23C 20/025 |
| | | 426/271 |
| 2016/0050951 A1 | 2/2016 | Motoyama et al. |

FOREIGN PATENT DOCUMENTS

| CN | 102283353 | 12/2011 |
| JP | S63-102646 | 5/1988 |
| JP | H8-173076 | 7/1996 |
| JP | 2000-184854 | 7/2000 |
| JP | 2002-360203 | 12/2002 |
| JP | 2005-253322 | 9/2005 |
| KR | 2002002380 | 3/2002 |

OTHER PUBLICATIONS

"Potassium Chloride Improves its Aftertaste" dated Sep. 24, 2012 obtained from http://www.foodprocessing.com.*
International Search Report dated May 27, 2014 in corresponding International Application No. PCT/JP2014/055920.
European Search Report dated Nov. 18, 2014 in corresponding European Patent Application No. 14 18 0126.
Massood Sadiq Butt, et al "Nutritional and Functional Properties of Some Promising Legumes Protein Isolates", 2010, pp. 373,379, vol. 9, No. 4, Pakistan Journal of Nutrition.
Moriwaki, et al., "Beans as sources for bean sprouts [4]—Bundo bean (*Vigna adiate*) and Black gram (*Vigna mungo*)-", Jan. 1, 1999, pp. 43-49, vol. 74, No. 1, Agriculture and Horticulture.
Mohamed, et al., "Chickpea, mungbean, cowpea and peanuts as substitutes for soybean curds.", Aug. 1989, pp. 385-394, vol. 24, No. 4, Int. J. Food Sci. Technol.
Cai, R. et al., "Preparation of Bean Curds from Protein Fractions of Six Legumes", Jun. 2001, pp. 3068-3073, vol. 49, No. 6, J. Agric. Food Chem.
Lee, et al., "Effect of mungbean [*Vigna radiate* (L.) Wilczek] protein isolates on the microbial transglutaminase-mediated porcine myofibrillar protein gels at various salt concentrations", Mar. 3, 2014, pp. 2023-2029, vol. 49, No. 9, International Journal of Food Science & Technology.
Lee, et al., "Evaluation of mungbean protein isolates at various levels as a substrate for microbial transglutaminase and water binding agent in pork myofibrillar protein gels", Jan. 29, 2013, pp. 1086-1091, vol. 48, No. 5., International Journal of Food Science and Technology.

* cited by examiner

*Primary Examiner* — Jyoti Chawla
(74) *Attorney, Agent, or Firm* — Stephen J. Weyer, Esq.; Stites & Harbison, PLLC

(57) ABSTRACT

The invention provides a gelled composition of mung bean protein comprising a mung bean protein and an alkali metal ion, wherein the gelled composition of mung bean protein comprises the alkali metal ion at 50 mM or greater based on the total amount of the gelled composition of mung bean protein.

3 Claims, No Drawings

MUNG BEAN PROTEIN GEL COMPOSITION AND CHEESE-LIKE FOOD

TECHNICAL FIELD

The present invention relates to a gelled composition of mung bean protein and to a cheese-like food.

BACKGROUND ART

Mung bean (*Vigna radiata* seed) is a seed with a high level of physiological function that has been used in China as a type of herbal remedy for reducing inflammation, and it is widely consumed in China and Southeast Asia regions. Mung bean is also a food that is highly useful as a protein source, since it is not recognized as a major food allergen. Patent literature 1 discloses the use of mung bean protein extracted from mung bean, in bread and cookies. Also, Non-patent literature 1 teaches that despite the high foamability of mung bean protein, it has lower gelling ability than other proteins.

Gelled foods are foods prepared utilizing the gelling ability of proteins and the like, and they include, for example, fermented foods such as cheese and yogurt, and desserts such as jelly and pudding. Most gelled foods use animal proteins such as milk protein, egg protein and gelatin. Because these animal proteins are major food causing food allergy, much research has been conducted on plant-based gelled foods that do not employ such materials. For example, patent literature 2 discloses a method for producing a processed cheese-like food using egg white, starch, milk protein, wheat protein, soybean protein, gelatin, collagen or the like as a coagulant. However, the processed cheese-like food described in patent literature 2 is not purely plant based and therefore cannot be ingested by patients with milk allergy or egg allergy. In patent literature 3 there is disclosed a method for producing a pure plant-based cream cheese-like food without using animal protein such as milk, by mixing soybean protein and vegetable fat or oil, and fermenting it with lactic acid bacteria.

CITATION LIST

Patent Literature

Patent literature 1: U.S. Pat. No. 4,111,927
Patent literature 2: JP2000-184854
Patent literature 3: JP Patent No. 4569630

Non-Patent Literature

Non-patent literature 1: Pakistan Journal of Nutrition 9 (4): 373-379, 2010

SUMMARY OF THE INVENTION

Technical Problem

Although the literature contains examples of mung bean protein extracted from mung bean, it is not widely used in food products. As mentioned above, mung bean protein has lower gelling ability than other proteins and therefore exhibits insufficient function as a gelling agent, such that no gelled foods have yet been obtained that utilize gelling with mung bean protein. Furthermore, the cheese-like food described in Patent literature 3, while being purely plant based, has not been satisfactory because soybean itself is one type of major food allergy, and because of the characteristic flavor of soybean protein. Thus, it has not yet been possible to obtain a pure plant-based cheese-like food having satisfactory flavor without using major food allergy substances.

It is therefore an object of the present invention to obtain a gelled composition of mung bean protein comprising a mung bean protein, and a cheese-like food using the gelled composition of mung bean protein.

Solution to Problem

The gelled composition of mung bean protein according to the invention comprises a mung bean protein and an alkali metal ion, wherein the gelled composition of mung bean protein comprises the alkali metal ion at 50 mM or greater based on the total amount of the gelled composition of mung bean protein.

According to the invention it is possible to obtain a gelled composition having sufficient strength without addition of animal protein, soybean protein or the like.

For the gelled composition of mung bean protein, at least one of sodium ion and potassium ion may be used as the alkali metal ion.

The gelled composition of mung bean protein may also comprise up to 50 wt % of a fat or oil based on the total weight of the gelled composition.

The invention further provides a cheese-like food comprising the aforementioned gelled composition of mung bean protein, and a flavoring. The cheese-like food of the invention can be provided as a cheese-like food having satisfactory flavor and mouthfeel, without using major allergy-causing foods such as animal protein or soybean protein.

Advantageous Effects of the Invention

According to the invention it is possible to obtain a gelled composition having high strength, using mung bean protein. It is therefore possible to provide a gelled composition without using animal protein or soybean protein, and then it can be eaten even by persons with allergies against such proteins. Furthermore, since the gelled composition of the invention contains a mung bean protein, it allows ingestion of the nutrients derived from mung bean protein. In addition, using the gelled composition of mung bean protein of the invention allows a cheese-like food to be provided having physical properties and flavor very similar to cheese.

DESCRIPTION OF EMBODIMENTS

Preferred embodiments of the invention will now be explained. However, the present invention is not limited to the embodiments described below.

(Gelled Composition of Mung Bean Protein)

The gelled composition of mung bean protein according to this embodiment comprises a mung bean protein and an alkali metal ion. The gelled composition of mung bean protein can be obtained by mixing a mung bean protein composition containing mung bean protein with an alkali metal ion to form an emulsion, and coagulating it.

(Mung Bean Protein)

The mung bean protein source used as the starting material for the gelled composition of mung bean protein may be a mung bean protein composition containing mung bean protein. The mung bean protein composition used may be mung bean milk or a composition of mung bean protein isolate, which may be utilized directly or after being dried, and they may also be utilized after being sterilized and dried. Mung bean milk can be obtained by extracting the protein components from whole mung beans or starch-removed mung beans using cold water or hot water, and removing the starch and dietary fiber components from the extracted solution. Additionally, it may be treated with a UF membrane (ultrafiltration membrane) to concentrate the protein components in the mung bean milk. A composition of mung bean protein isolate can be obtained by concentrating the protein using treatment such as isoelectric precipitation from mung bean milk. The mung bean protein composition preferably contains mung bean protein at 60 wt % or greater or more preferably 80 wt % or greater as dry weight of crude protein. Therefore, the whole mung bean or starch-removed mung bean used as the starting material for mung bean milk or the like preferably has a high protein content in the whole mung bean or starch-removed mung bean.

The composition of mung bean protein isolate can be prepared in the following manner, for example. Specifically, cold water or hot water is added to whole mung bean for immersion for about 10 hours to 30 hours, and after milling, the seed coats are removed with a mesh. Next, extraction is performed at nearly neutral pH and the insolubles are separated off to obtain mung bean milk. The obtained mung bean milk is then adjusted to near pH 3.5 to 5.5, and the isoelectric precipitate is collected as a composition of mung bean protein isolate. Water and an alkali agent are added to the collected precipitate (the composition of mung bean protein isolate), for adjustment to a solid concentration of 5 to 15 wt % and a pH of 5.7 to 8.0 or preferably a pH of near 6.8 to 7.5, to obtain a liquid composition of mung bean protein isolate. The solution obtained in this manner may be used directly for the subsequent steps, or it may be dried for use or used by re-dissolution after drying. When it is to be dried, sterilization treatment may be carried out before drying. The isoelectric precipitate may also be used after drying, without neutralization.

The mung bean protein content of the gelled composition of mung bean protein is preferably 8.3 to 15.0 wt %, more preferably 8.3 to 13.3 wt % and further preferably 10.0 to 13.3 wt % based on the total weight of the gelled composition of mung bean protein, as crude protein calculated by the Kjeldahl method. If the mung bean protein content is within the aforementioned range, it will be possible to form a characteristic gel with little of the fragility derived from the mung bean protein itself, but with high strength. The method for measuring the concentration of the mung bean protein in the gelled composition of mung bean protein may be Western blotting, for example. Specifically, the gelled composition of mung bean protein is ground, a sample buffer containing a reducing agent such as SDS and 2-mercaptoethanol is added, and extraction of the protein is performed in boiling water for 10 minutes. Next, mung bean proteins adjusted in several different concentrations (controls) are used for SDS-PAGE simultaneously with the sample, and transfer to a PVDF (Polyvinylidene difluoride) membrane by a semi-dry method. Anti-mung bean protein antibody, as primary antibody, is reacted with the transferred membrane, and antibody labeled with AP (Alkaline phosphatase) or HRP (Horse radish peroxidase) is used as secondary antibody for reaction with the primary antibody, to allow quantitation of the mung bean protein based on coloration by enzyme activity or the like.

(Alkali Metal Ion)

Examples of alkali metal ions include monovalent ions such as sodium ion and potassium ion. Combinations of two or more selected from among these may also be included. In order to supply the alkali metal ion to the gelled composition, it may be added as a salt that can ionize in aqueous solution to yield the ion form of the alkali metal, and salts that may be used include chloride, carbonate and phosphate salts. Of such salts, a chloride salt is preferred for more satisfactory flavor and the like. The amount of alkali metal ion in the gelled composition of mung bean protein is preferably at least 50 mM and preferably no greater than 3 M and more preferably no greater than 1 M, based on the total amount of the gelled composition of mung bean protein. Also, when two or more different alkali metal ions are used, their total concentration may be in the range specified above. Throughout the present specification, "molar concentration" (units: M) is used as a term meaning the number of moles per 1 L of gelled composition. The sodium ion content is preferably at least 50 mol % of the total alkali metal ion in the gelled composition of mung bean protein. If the sodium ion content is at least 50 mol %, the flavor will be more satisfactory than when the potassium ion content is greater. The method used to measure the concentration of alkali metal ion in the gelled composition of mung bean protein may be fluorescent X-ray analysis, for example.

(Fat or Oil)

In this embodiment, a fat or oil may be mixed with the gelled composition of mung bean protein of this embodiment. The fat or oil used may be a single type or two or more types selected from among animal and vegetable fats and oils, as well as processed fats and oils made from these fats and oils, such as hydrogenated oils, fractionated oils, transesterified oils, diglycerides, medium chain fatty acid-containing fats and oils and the like. Examples of animal fats and oils include beef tallow, milk fat, lard, fish oil and whale oil. Examples of vegetable fats and oils include soybean oil, rapeseed oil, rice oil, sunflower oil, safflower oil, palm oil, palm kernel oil, coconut oil, corn oil, cottonseed oil, peanut oil, sal fat, shea butter, cocoa butter, mustard oil and the like. Vegetable fats and oils are preferably selected for use from among these. Using palm fractionated oil or rapeseed hydrogenated oil are particularly preferable because they can impart a mouthfeel with satisfactory melting in the mouth. The melting point of the fat or oil may be appropriately selected in consideration of the desired hardness of the gelled composition, and preferably be 15° C. to 40° C. and more preferably 20° C. to 37° C. The concentration of the fat or oil, in the case where a fat or oil is added to the gelled composition, is preferably up to 50 wt % based on the total weight of the gelled composition, and more preferably 1 to 50 wt %, further preferably 5 to 40 wt % and especially preferably 10 to 30 wt %. The method for measuring the concentration of the fat or oil in the gelled composition of mung bean protein may be the Soxhlet method, for example.

(Method for Producing Gelled Composition of Mung Bean Protein)

The method of mixing the materials to obtain the gelled composition of mung bean protein may be selected from among a variety of methods, and for example, homogenization means such as a known homogenizer may be used. Homogenization can yield an emulsion of the material. Since the homogenization pressure will affect the hardness of the gelled composition texture, it may be appropriately set according to the desired quality, and it will usually be appropriate at 2.5 to 15 MPa (25-150 kg/cm$^2$). If a processed cheese-like mouthfeel is desired, homogenization may be accomplished by mixing the materials with a food processor, mixer, silent cutter or the like.

The method for coagulating, i.e. gelling the emulsion may be selected from among a variety of methods. For example, the emulsion may be coagulated by heating for a desired time at a temperature of 80° C. or higher. Also, the protein-crosslinking enzyme transglutaminase may be added to the emulsion and reacted to coagulate the emulsion. In addition, a known gelling agent may be added to the emulsion to modify the gel strength and gel properties of the obtained gelled composition of mung bean protein.

The gelled composition of mung bean protein obtained by the method described above can be provided directly for consumption, or it may be provided for applying in various types of gelled foods. Examples of gelled foods include cheese-like foods, jelly-like foods, and solid or semi-solid foods for the elderly with dysphagia.

(Cheese-Like Food)

A cheese-like food in this embodiment is one that comprises a mung bean protein, an alkali metal ion, a fat or oil and a flavor, and is a coagulated mixture thereof. A flavor having cheese flavor may be used properly as the flavor used in a cheese-like food. The flavor content in the cheese-like food is preferably up to 1.0 wt % and more preferably up to 0.5 wt %, based on the total weight of the cheese-like food.

A cheese-like food can be prepared by coagulating an emulsion obtained by mixing the starting materials, by the same method as for a gelled composition. It can also be prepared by acidifying the emulsion for coagulation. The acidification means may employ a method of adding an acid, a method of lactic acid bacteria fermentation, or a combination thereof.

When an acid is added to lower the pH, the emulsion can be used directly or after concentration. When lactic acid bacteria fermentation is to be carried out, the emulsion is preferably subjected to a sterilizing step in advance. The sterilizing device used for the sterilization is not particularly restricted so long as it is a common sterilizing device. The sterilization conditions are not particularly restricted, but will usually be 80° C. to 160° C. for about 3 seconds to 15 minutes. The type of acid used for pH adjustment is not particularly restricted, and examples include inorganic acids such as phosphoric acid, hydrochloric acid and sulfuric acid, and organic acids such as citric acid, malic acid, lactic acid, gluconic acid and GDL (glucono-δ-lactone), and any one type or combination of two or more types of these may be used. An organic acid is preferably used to improve the flavor.

When the pH is to be lowered by lactic acid fermentation, the lactic acid bacteria used may be a type commonly used in yogurt or cheese, with no particular restrictions. Examples of lactic acid bacteria include known species, for example, *Lactobacillus* species such as *Lactobacillus bulgaricus*, *Lactobacillus helveticus* and *Lactobacillus lactis* subsp. *cremoris*; *Lactococcus* species such as *Lactococcus lactis* subsp. *lactis*, *Lactococcus lactis* subsp. *diacetylactis* and *Lactococcus lactis* subsp. *lactis biovar diacetylactis*; *Streptococcus* species such as *Streptococcus thermophilus*; *Leuconostoc* species such as *Leuconostoc mesenteorides* subsp. *cremoris* and *Leuconostoc pseudomesenteorides*; and *Bifidobacterium* species such as *Bifidobacterium bifidum*, *Bifidobacterium longum* and *Bifidobacterium breve*. These lactic acid bacteria may be used alone or in any desired combinations of two or more.

The fermentation method may be addition of a previously prepared bulk starter, or addition of frozen concentrated cells or lyophilized concentrated cells directly to the emulsion. The amount of addition can be adjusted according to the fermentation temperature and fermentation time. The lactic acid fermentation temperature and time are preferably 20° C. to 50° C. for 3 to 48 hours, and more preferably 20° C. to 45° C. for 4 to 30 hours.

When fermentation is to be conducted, a lactic acid bacteria assimilable saccharide such as glucose, maltose or lactose is preferably added beforehand to the emulsion. In a case where a lactic acid bacteria assimilable saccharide is to be added, the amount of addition may be an amount sufficient to generate lactic acid, depending on the lactic acid bacteria used, and it will usually be about 0.2 to 5 wt % in the emulsion.

In the case of adjustment to acidity, the adjustment may be as appropriate according to preference, but the pH will usually be pH 3.5 to 6, preferably pH 3.5 to 5.5, more preferably pH 4 to 5.5 and further preferably pH 4.5 to 5.5. Acid taste can be minimized if the pH is 3.5 or greater. If the pH is 6 or lower, the flavor of fermentation can be adequately imparted when fermentation is carried out, or when the whey is removed for production, it will be possible to increase the curd yield.

After the emulsion has been adjusted to the prescribed pH, a step may be carried out, if necessary, in which the whey is separated out and the curd recovered. When the whey has been separated out, it is possible to produce a solid or semi-solid cream cheese-like food having a high solid content. A conventional known separation method may be employed for whey separation. The whey separation preferably employs a centrifugal separator but it may employ mechanical pressing or the like. Also, when the whey is not separated out it is possible to produce a liquid or pasty cream cheese-like food with a low solid content. Whether or not to separate out the whey can be appropriately determined in consideration of the physical properties suited for the purpose of the food that is to be produced.

Next, heat sterilization is performed on the emulsion from which the whey has not been removed, or on the curd obtained by removing the whey from the emulsion. When a fermentation method is used for acidification, fermentation may be carried out with an alkali metal ion-containing starting material as the emulsion, or fermentation may be carried out with the starting material except alkali metal ion as the emulsion, and the alkali metal ion added after fermentation. The heating conditions are not particularly restricted, but 70° C. to 85° C. for about 1 second to 15 minutes is appropriate.

An acidic emulsion is obtained after heat sterilization, optionally with homogenization. The homogenization treatment may employ known means such as a homogenizer. The homogenization pressure is suitably 1.0 to 15 MPa (10-150 kg/cm$^2$). After homogenization, the mixture is cooled to about 4° C. to 10° C. to obtain a cheese-like food.

The gelled composition of mung bean protein and cheese-like food in this embodiment may further contain proteins other than mung bean-derived proteins, such as soybean protein or milk protein, as well as flavorings such as milk flavor; seasonings such as sodium glutamate; various spices; purees such as fruit puree; powders such as fruit powder; and sweeteners such as sucrose, glucose, sorbitol, aspartame and stevia, for the purpose of imparting flavor. They may further contain oil-soluble pigments such as β-carotene or annatto color, for the purpose of adjusting the color tone. They may yet further contain additives including thickening stabilizers such as starches or water-soluble soybean polysaccharides, and various preservatives. The moisture content of the cheese-like food may be adjusted according to the required physical properties, with a higher content tending toward a more paste-like and liquid-like food, and a lower content tending toward a more solid-like food.

The gelled composition of mung bean protein and cheese-like food may also employ emulsifiers such as lecithin, fatty acid esters and organic acid monoglycerides; and gelling agents such as locust bean gum, guar gum, xanthan gum, gum arabic, agar and gelatin, in order to impart emulsified stability. Notably, however, their use in excess may impair the flavor or mouthfeel. Thus, the present invention is advantageous in that a gelled composition or cheese-like food can be produced without using large amounts of such additives. When such additives are used, therefore, their addition amounts is preferably less than 0.5 wt %, more preferably less than 0.2%, further preferably less than 0.1% and most preferably less than 0.05% in the total gelled composition of mung bean protein or cheese-like food.

The gelled composition of mung bean protein and cheese-like food of this embodiment may be provided directly for consumption, or it may be widely used as a food material for substitute products such as spreads, fillings, fresh cream and sour cream, sauces such as cream sauce or curry sauce, and Western confectionery materials such as cheesecakes, puddings and bavarois.

EXAMPLES

Embodiments of the present invention will now be explained in detail by examples, with the understanding that the invention is in no way limited to the examples.

(Production Example 1) Method of Preparing Mung Bean Milk Powder

After adding 1 part by weight of whole mung bean to 5 parts by weight of water, it was immersed for 22 hours and the husks and embryonic areas were separated by an established method. Next, a colloid mill (product of Primix Corp.) was used for milling, the pH was adjusted to 8.5, extraction was performed at 50° C. for 30 minutes while stirring with a homomixer (product of Primix Corp.), and centrifugal separation was carried out at 3,000×g to remove the insoluble matter and obtain mung bean milk.

The obtained mung bean milk was heated at 120° C. for 10 seconds each using a continuous direct-heating sterilizer (product of Alfa Laval AB), and spray-drying was carried out with a spray drier to obtain mung bean milk powder.

(Production Example 2) Method of Preparing a Composition of Mung Bean Protein Isolate Mung bean milk was obtained in the same manner as for preparation of the mung bean milk powder. The obtained mung bean milk was adjusted to pH 4.5 with hydrochloric acid for isoelectric precipitation, and subjected to centrifugal separation to obtain acid-precipitated curd. Water was added in a 4-fold amount, and the pH was adjusted to 7.0 with sodium hydroxide to obtain a solution containing a composition of mung bean protein isolate. The obtained solution was heated at 120° C. for 10 seconds each using a continuous direct-heating sterilizer (product of Alfa Laval AB), and spray-drying was carried out with a spray drier to obtain a composition of mung bean protein isolate.

(Comparative Production Example 1) Method of Preparing a Composition of Chickpea Protein Isolate Dehusked chickpea was used to obtain a composition of chickpea protein isolate by the same method as for the composition of mung bean protein isolate.

The protein content (wt %) and pH were measured for the obtained mung bean milk powder, composition of mung bean protein isolate and composition of chickpea protein isolate. The protein content was expressed as crude protein content (CP/dry) obtained by multiplying the nitrogen coefficient of 6.25 by the nitrogen content measured by the Kjeldahl method. The results are shown in Table 1.

TABLE 1

|  | Mung bean protein powder | Composition of mung bean protein isolate | Composition of chickpea protein isolate |
| --- | --- | --- | --- |
| CP/dry (%) | 61.4 | 83.2 | 70.9 |
| pH | 7.0 | 7.0 | 6.9 |

(Gelled Composition of Fat-Free Mung Bean Protein)

(Comparative Example 1)

The effect of alkali metal salt addition on gelling of the mung bean protein composition was examined. First, as Comparative Example 1, 30 g of the composition of mung bean protein isolate was added to 135 g of water (15.1 wt % as the crude protein content with respect to the total gelled composition of mung bean protein), and the mixture was heated at 80° C. for 30 minutes to obtain gelled composition of mung bean protein A.

Examples 1 to 3

Next, as Examples 1 and 2, samples were prepared in the same manner as Comparative Example 1, except that NaCl or KCl was added for sodium or potassium as the alkali metal ion at 50, 100, 150 and 200 mM based on the total amount of the gelled composition, to obtain gelled compositions of mung bean protein B to I. Also, as Example 3, a sample was prepared in the same manner as Comparative Example 1, except that NaCl and KCl were each added for sodium and potassium concentrations of 70 mM:30 mM, 50 mM:50 mM and 30 mM:70 mM based on the total amount of the gelled composition of mung bean protein, with a total concentration of 100 mM, to obtain gelled compositions of mung bean protein J to L.

The gel strengths of the gelled compositions of mung bean protein obtained in Comparative Example 1 and Examples 1 to 3 were measured. As the method for measuring the gel strength, a gelled composition sample with a thickness of 20 mm was prepared and a 5 mm spherical plunger was used for evaluation using a RHEONER (Yamaden Co., Ltd.). The breaking strength (gf) and breaking deformation (cm) were measured, and the product of these values was evaluated as the gel strength (gf·cm). The results are shown in Table 2. Based on the measurement results, the gel strength was 21.3 gf·cm in Comparative Example 1 where absolutely no alkali metal ion was added, while the gel strength was confirmed to be increased under all conditions in which either or both of the alkali metal salts NaCl and KCl were added, compared to no addition. Furthermore, the measurement results of the gelled compositions of mung bean protein J to L, confirmed that if the total concentration of NaCl and KCl is the same, the blending ratio of sodium and potassium does not affect the gel strength of a gelled composition of mung bean protein isolate.

TABLE 2

|  |  | NaCl mM | KCl mM | Breaking strength gf | Breaking deformation cm | Gel strength gf · cm |
|---|---|---|---|---|---|---|
| Comparative Example 1 | A | 30 |  | 45.0 | 0.47 | 21.3 |
| Example 1 | B | 50 |  | 80.3 | 0.55 | 43.9 |
|  | C | 100 |  | 107.7 | 0.45 | 48.5 |
|  | D | 150 |  | 107.0 | 0.39 | 41.5 |
|  | E | 200 |  | 108.7 | 0.36 | 39.0 |
| Example 2 | F |  | 50 | 68.3 | 0.47 | 31.9 |
|  | G |  | 100 | 101.3 | 0.44 | 45.0 |
|  | H |  | 150 | 107.3 | 0.41 | 43.7 |
|  | I |  | 200 | 102.0 | 0.37 | 37.6 |
| Example 3 | J | 70 | 30 | 104.5 | 0.45 | 47.0 |
|  | K | 50 | 50 | 105.5 | 0.45 | 47.5 |
|  | L | 30 | 70 | 103.9 | 0.45 | 46.8 |

(Effect of Alkali Metal Ion Concentration and Mung Bean Protein Concentration on Gel Formation)

In Non-patent literature 1, it has been reported that a mung bean protein isolate is gelling if the protein composition concentration is 16 wt % or greater (13.7 wt % as the crude protein concentration) in solution. Also, in aforementioned examining the gelled composition of fat-free mung bean protein, addition of an alkali metal salt succeeded in further increasing the gel strength of the gelled composition of mung bean protein. Here, we examined the influence of the alkali metal ion concentration and mung bean protein concentration on gelling of a mung bean protein isolate. As the evaluation method, first, solutions were prepared by dispersion in water to a NaCl concentration in the total gelled composition of 30, 50, 100, 150 or 200 mM and a mung bean protein concentration in the total gelled composition of 10.0, 11.6 or 13.3 wt %, as shown in Table 3. Next, the uniformly mixed solution was filled into a 25 mm diameter casing and heated for 30 minutes in hot water bath at 80° C., and then water-cooled and was taken out from the casing. Samples that were gelled and retained their shapes after taking out were evaluated as A, and those that did not gel were evaluated as B. The results are shown in Table 3.

When the alkali metal salt concentration was 30 mM in the total mixed solution, gelling did not occur if the crude protein content in the gel of the composition of mung bean protein isolate was less than 13 wt %, similar to the results published in Non-patent literature 1. On the other hand, when the alkali metal salt concentration was 50 mM or greater, it was confirmed that gelling was occurred even with a crude protein content of 10 wt % in the gel of the composition of mung bean protein isolate. Thus, it was newly discovered that addition of an alkali metal salt increases the minimum gelling concentration of a composition of mung bean protein isolate.

TABLE 3

|  |  | Mung bean protein concentration (wt %) | | |
|---|---|---|---|---|
|  |  | 10.0 | 11.6 | 13.3 |
| NaCl concentration | 30 mM | B | B | A |
|  | 50 mM | A | A | A |
|  | 100 mM | A | A | A |
|  | 150 mM | A | A | A |
|  | 200 mM | A | A | A |

(Gelled Compositions of Fat-Containing Protein)

After mixing one of different protein compositions, water and refined soybean oil in the mixing proportions shown in Table 4, a uniform paste was prepared with a Waring blender. The protein compositions used were the composition of mung bean protein isolate, soybean protein isolate (trade name: FUJIPRO E by Fuji Oil Co., Ltd.) and mung bean milk powder, and they were prepared to a crude protein content of 13.3 wt % with respect to each total gelled composition. After heating the paste for 30 minutes in a hot water bath at 80° C. it was water-cooled to obtain gelled compositions of fat-containing protein for Comparative Examples 2 to 4. Also, there were similarly produced ones with 200 mM of NaCl based on the total amount of the gelled composition of fat-containing protein, in addition to the proportions of Comparative Examples 2 to 4, to obtain gelled compositions of fat-containing protein for Examples 5 and 6 and Comparative Example 5.

The gel strength of the obtained gelled composition of fat-containing protein was evaluated by the same method as for evaluation of the gelled composition of fat-free mung bean protein, using a RHEONER. The results are shown in Table 4. When a mung bean protein composition was used, addition of NaCl significantly augmented the gel strength. On the other hand, it was confirmed that when the gelled composition has been prepared using soybean protein isolate, addition of an alkali metal ion reduces the gel strength. This indicates that a composition of mung bean protein isolate specifically increases gel strength by addition of an alkali metal ion. Furthermore, it was confirmed that this property is the same with mung bean milk powder, and that while the gel strength itself is less than that of a composition of mung bean protein isolate, addition of an alkali metal ion to mung bean milk powder increases the gel strength.

TABLE 4

|  | Composition of mung bean protein isolate g | Mung bean milk powder g | Composition of soybean protein isolate g | Water g | Refined soybean oil g | Concentration of NaCl-added mM | Breaking strength gf | Breaking deformation cm | Gel strength gf · cm |
|---|---|---|---|---|---|---|---|---|---|
| Comp. Ex. 2 | 26.4 | — | — | 105.6 | 33 | 0 | 86.7 | 0.4 | 34.7 |
| Example 5 | 26.4 | — | — | 105.6 | 33 | 200 | 119.3 | 0.4 | 45.1 |
| Comp. Ex. 3 | — | 26.4 | — | 105.6 | 33 | 0 | 21.0 | 0.4 | 9.1 |
| Example 6 | — | 26.4 | — | 105.6 | 33 | 200 | 28.3 | 0.4 | 11.5 |
| Comp. Ex. 4 | — | — | 26.4 | 105.6 | 33 | 0 | 123.3 | 1.1 | 136.9 |
| Comp. Ex. 5 | — | — | 26.4 | 105.6 | 33 | 200 | 138.3 | 0.7 | 96.8 |

(Cheese-Like Food)

Cheese-like foods were produced comprising the composition of mung bean protein isolate or the mung bean milk powder as Examples 7 and 8, in the mixing proportions shown in Table 5. Also, as Comparative Examples 6 to 8 there were produced cheese-like foods comprising the composition of soybean protein isolate, a composition of pea protein isolate (trade name: NUTRALYS S85F by Roquette) or the composition of chickpea protein isolate. The units for the mixing proportions in Table 5 are parts by weight. As the production method, 59 parts by weight of water was added with respect to 14 parts by weight of each protein composition (11.6 parts by weight as the crude protein content), and a ROBOT COUPE (product of FMI Corp.) was used for thorough kneading. Next, after adding 25 parts by weight of rapeseed oil and kneading, 1.5 parts by weight of salt (257 mM with respect to the total cheese-like food) was added and the mixture was thoroughly kneaded, two different cheese flavorings were added to a total of 0.1 part by weight, and the mixture was heated at 80° C. for 30 minutes to obtain cheese-like foods comprising different protein compositions.

TABLE 5

|  |  | Example 7 | Example 8 | Comp. Ex. 6 | Comp. Ex. 7 | Comp. Ex. 8 |
|---|---|---|---|---|---|---|
| Protein composition | Mung bean isolate | 14 | — | — | — | — |
|  | Mung bean milk powder | — | 14 | — | — | — |
|  | Soybean isolate | — | — | 14 | — | — |
|  | Pea isolate | — | — | — | 14 | — |
|  | Chickpea isolate | — | — | — | — | 14 |
|  | Rapeseed oil | 25 | 25 | 25 | 25 | 25 |
|  | Water | 59 | 59 | 59 | 59 | 59 |
|  | Salt | 1.5 | 1.5 | 1.5 | 1.5 | 1.5 |
|  | Cheese flavoring 1 | 0.05 | 0.05 | 0.05 | 0.05 | 0.05 |
|  | Cheese flavoring 2 | 0.05 | 0.05 | 0.05 | 0.05 | 0.05 |
|  | Total | 100 | 100 | 100 | 100 | 100 |
|  | Hydrolysis factor | 4.2 | 4.2 | 4.2 | 4.2 | 4.2 |

The obtained cheese-like foods were evaluated for gelling ability. As the evaluation criterion, after taking out from the casing, samples that were gelled and retained their shapes were evaluated as A, and those that did not retain their shapes were evaluated as B. The presence of oil-off (separation of the oil and fat content) was also observed. The results are shown in Table 6. When using a composition of mung bean protein isolate, a mung bean milk powder and a composition of soybean protein isolate (Examples 7 and 8 and Comparative Example 6), it is possible to form a gel that satisfactorily retains its shape, with no oil-off found in the obtained gelled composition. On the other hand, when using a composition of pea protein isolate or a composition of chickpea protein isolate (Comparative Examples 7 and 8), the oil-off was considerable and a satisfactory gel could not be formed.

TABLE 6

|  | Example 7 Mung bean protein isolate | Example 8 Mung bean milk powder | Comp. Ex. 6 Soybean protein isolate | Comp. Ex. 7 Pea protein isolate | Comp. Ex. 8 Chickpea protein isolate |
|---|---|---|---|---|---|
| Gelling | A | A | A | B | B |
| Oil-off | None | None | None | Very considerable | Considerable |

The cheese-like foods obtained in Example 7 and Comparative Example 6 were used for the following organoleptic evaluation and physical property evaluation.

(Organoleptic Evaluation)

The cheese-like food comprising mung bean protein isolate or soybean protein isolate was subjected to an organoleptic evaluation with 12 general panelists. For organoleptic evaluation of the mouthfeel, a relative evaluation was conducted on a 5-level scale in which a commercial processed cheese product (Baby Cheese (Plain), by Rokko Butter Co., Ltd.) is 5, based on the parameters of hardness, non-elasticity and distensibility. Also, for organoleptic evaluation of flavor, relative evaluation was conducted on a 5-level scale each, with high compatibility with cheese flavor as 5, good flavor onset as 5 and lack of off-taste as 5. The average points for the three parameters of hardness, non-elasticity and distensibility were recorded as the "cheese-likeness of mouthfeel", and the average points for the three parameters of compatibility with cheese flavor, flavor onset and lack of off-taste were recorded as the "cheese-likeness of flavor". The results are shown in Table 7. For all of the parameters, using a composition of mung bean protein isolate resulted in a higher and more satisfactory evaluation than using a composition of soybean protein isolate. Also, for the mouthfeel, using a composition of mung bean protein isolate allows preparation of a cheese-like food having a mouthfeel more similar to the commercial processed cheese product.

TABLE 7

| | | Mouthfeel | | | | Flavor | | | |
|---|---|---|---|---|---|---|---|---|---|
| | | Hardness | Non-elasticity | Distensibility | Cheese-likeness of mouthfeel | Compatibility with cheese flavor | Flavor onset | Lack of off-taste | Cheese-likeness of flavor |
| Example 7 | Mean | 3.3 | 3.7 | 3.4 | 3.5 | 3.8 | 3.6 | 3.9 | 3.8 |
| | Standard Deviation | 1.07 | 0.78 | 1.00 | 0.70 | 0.94 | 1.16 | 1.00 | 0.91 |
| Comp. Ex. 6 | Mean | 3.0 | 2.4 | 2.3 | 2.6 | 2.5 | 2.5 | 2.7 | 2.6 |
| | Standard Deviation | 0.95 | 0.67 | 0.87 | 0.57 | 0.67 | 0.67 | 0.89 | 0.54 |

(Physical Property Evaluation)

The physical properties of the cheese-like foods obtained in Example 7 and Comparative Example 6 were evaluated. As a control there was used a commercial processed cheese product (Baby Cheese (Plain) by Rokko Butter Co., Ltd.). These were cut out to a thickness of 12 mm, and a 5 mm spherical plunger was used for evaluation with a RHEONER (product of Yamaden Co., Ltd.). The evaluation parameters measured as physical properties were the breaking deformation (mm), breaking strain ratio (%), brittle deformation (mm) and brittle strain ratio (%). The brittle deformation is the deformation distance from breaking point to brittle point, and the brittle strain ratio is the ratio of the brittle deformation with respect to the original thickness of the sample. Also, the brittle point is the point at which the stress again changes to increase in a breaking test when the plunger is further introduced after breaking. The results are shown in Table 8.

TABLE 8

| | Processed cheese | Example 7 | Comparative Example 6 |
|---|---|---|---|
| Breaking deformation (mm) | 3.8 | 4.5 | 5.2 |
| Breaking strain (%) | 31.4 | 37.4 | 42.9 |
| Brittle deformation (mm) | 6.1 | 6.3 | 1.8 |
| Brittle strain (%) | 50.7 | 52.1 | 15.1 |

As a result of the evaluation, the physical properties exhibited by the commercial processed cheese product as the control were characterized by low breaking deformation and breaking strain, and high brittle deformation and brittle strain. In contrast, Comparative Example 6 had high breaking deformation and strain and low brittle deformation and brittle strain, confirming that it exhibited completely different physical properties than the commercial processed cheese product. Example 7, which used the composition of mung bean protein isolate, exhibited brittle deformation and brittle strain essentially equal to that of the control, while the breaking deformation and breaking strain were values closer to the control than the gel of soybean protein isolate. In other words, it was confirmed that the cheese-like food using a composition of mung bean protein isolate have physical properties more similar to processed cheese. Thus, it was confirmed that a cheese-like food exhibits flavor and physical properties similar to common processed cheese by using a composition of mung bean protein isolate in particular, among other vegetable protein compositions.

The invention claimed is:

1. A gelled composition of mung bean protein comprising a mung bean protein and an alkali metal ion,
    wherein the gelled composition of mung bean protein comprises the alkali metal ion being at least 50 mM and no greater than 3M based on the total amount of the gelled composition of mung bean protein,
    wherein the alkali metal ion is at least one of sodium ion and potassium ion, and
    wherein the gelled composition of mung bean protein does not comprise soybean protein.

2. The gelled composition of mung bean protein according to claim 1, further comprising no greater than 50 wt % of a fat or oil based on the total weight of the gelled composition of mung bean protein.

3. A cheese-like food comprising:
    a gelled composition of mung bean protein comprising a mung bean protein and an alkali metal ion, wherein the gelled composition of mung bean protein comprises the alkali metal ion being at least 50 mM and no greater than 3M based on the total amount of the gelled composition of mung bean protein and wherein the alkali metal ion is at least one of sodium ion and potassium ion and wherein the gelled composition does not comprise soybean protein;
    a fat or oil no greater than 50 wt % based on a total weight of the gelled composition of mung bean protein; and
    a flavoring.

* * * * *